United States Patent Office 3,321,431
Patented May 23, 1967

3,321,431
AQUEOUS RESIN EMULSIONS
John McNab Cruden, 20 Edmunds Tower, and Clemens Bondy, "Southdown," Tye Green Village, both of Harlow, Essex, England
No Drawing. Filed Oct. 5, 1964, Ser. No. 401,673
Claims priority, application Great Britain, Oct. 3, 1963, 39,053/63
28 Claims. (Cl. 260—29.6)

This invention relates to the preparation of aqueous emulsions of useful polymeric resins. In particular, this invention relates to resins which incorporate a copolymerised ethylenically unsaturated amide of general formula:

(Formula I)

where $R_1$ is a hydrogen atom or a methyl radical and $R_2$ is a hydrogen atom or a hydroxymethyl radical.

In accordance with the present invention, emulsions of resins containing unsaturated monomers of this type, i.e. acrylamide, methacrylamide and their N-methylol derivatives may be prepared, which are particularly useful in, for example, surface coating, adhesive and sizing applications. The resins may be cross-linked with formaldehyde and various formaldehyde condensate resins, or, in the case of copolymer resins containing the methylolated amides, simply by heating. Films formed from these cross-linked resins exhibit excellent toughness and chemical and solvent resistance.

However, because of the high water solubility of acrylamide and its simpler derivatives, the preparation of these resins in emulsion form has in the past presented great difficulties, particularly where the greater proportion of the copolymer resin is derived from monomers such as styrene and 2-ethylhexyl acrylate which are effectively insoluble in water. Consequently, copolymerisation in an organic solvent such as butanol has generally been resorted to in the preparation of resins containing acrylamide and its simpler derivatives but preparation in emulsion forms is preferable for several reasons: the resulting emulsion may conveniently be thinned with water, faster polymerisation rates are obtained and the necessity of removing a possible toxic and/or inflammable solvent in formulation is obviated.

According to the present invention there is provided a process for preparing an aqueous, copolymer emulsion, which comprises subjecting to aqueous emulsion polymerisation, in the presence of a radical-producing initiator and an emulsion stabiliser, a mixture comprising (I) An ethylenically unsaturated amide of the general formula

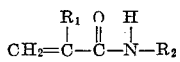

where $R_1$ is a hydrogen atom or a methyl radical and $R_2$ is a hydrogen atom or a hydroxymethyl radical, said amide being present in an amount of up to 35 percent by weight of the polymerisable constituents of the mixture.

(II) One or more monomers selected from itaconic acid, monomethyl itaconate, dimethyl itaconate and monoethyl itaconate, (III) A partially or completely water-soluble organic solvent which is present in an amount of 1 to 10 percent by weight of the polymerisable constituents of the mixture, and which is a monohydric alcohol containing up to 4 carbon atoms, a water-soluble heterocyclic compound having a 5-membered ring which may be substituted on the ring with oxygen, a hydroxyl radical or an alkyl radical containing up to 4 carbon atoms, acetone, methyl ethyl ketone, acetonitrile, propionitrile, N,N-dimethyl formamide, N,N-diethyl formamide, dioxan dimethyl sulphoxide, acrylonitrile, methacrylonitrile, and methyl vinyl ketone, (IV) One or more other ethylenically unsaturated monomers copolymerisable with monomers (I) and (II).

Another aspect of the present invention resides in the emulsions prepared by the above process.

Attempts to prepare emulsions of copolymers of acrylamide with typical hydrophobic monomers where the acrylamide is present in concentrations of greater than 2 to 3 percent usually fail as the result of substantial homopolymerisation of the acrylamide in the aqueous phase, leading to coagulation of the emulsion. It is therefore surprising that the present copolymer emulsions containing up to 35 percent by weight of acrylamide or other unsaturated amide in the copolymer can be prepared. It is our belief that the presence of the partially water-soluble itaconate monomer substantially reduces the extent of water-phase polymerisation of the unsaturated amide and that, as the itaconate monomer in the presence of the minor quantity of organic solvent is readily accessible to the water-insoluble monomers, a true copolymerisation of the various monomers is effected by the present process.

The various components used in the preparation of the present emulsions may be grouped under six headings:

(I) A polymerisable unsaturated amide of Formula I as already described.

(II) One or more monomers selected from itaconic acid, monomethyl itaconate, dimethyl itaconate and monoethyl itaconate.

(III) An organic solvent which is soluble in water in a concentration above 10 percent by weight. The organic solvent may be a monohydric alcohol containing up to 4 carbon atoms, such as methanol, ethanol, n-propanol, iso-propanol or t-butanol; a water-soluble heterocyclic organic compound having a 5-membered ring which may be substituted with oxygen, a hydroxyl radical or an alkyl radical containing up to 4 carbon atoms, such as N-methyl pyrrolidone, 1,3-oxazol-2-one, tetrahydrofuran and tetramethylene sulphone, acetone, methyl ethyl ketone. acetonitrile, propionitrile, N,N-dimethyl formamide, N,N-diethyl formamide and dimethyl sulphoxide.

The solvent may also be chosen from the water-soluble polymerisable monomers acrylonitrile, methacrylonitrile and methyl vinyl ketone.

(IV) One or more ethylenically unsaturated monomers which is or are chosen to give the resin the properties desired and which may be chosen from a very wide group of monomers discussed below.

(V) Water containing an emulsion stabilizer.

(VI) One or more radical-producing polymerisation initiators such as a peroxydisulphate salt, an organic peroxide or hydroperoxide or an azo compound. These may be used in conjunction with activators, e.g. reducing agents such as sodium bisulphite or sodium formaldehyde sulphoxylate or heavy metal ions.

The proportions of the various monomers employed in any particular emulsion may vary according to the properties desired in the copolymer resin and these resins may be of widely differing types. When the proportions of monomers from Groups I, II and possibly III are low, i.e. less than about 10 percent and the monomers chosen from Group IV are such as when polymerised tend to produce very soft resins, then the copolymer emulsion will dry to give a soft, tacky resin most suitable for adhesive applications. Conversely when the monomers chosen from Group IV are such as tend to polymerise to very hard resins then the copolymer emulsion will be most suitable for the formulation of hard surface coatings. By alteration of the ratios of these monomers a variety of differing and useful copolymer resins may be prepared.

In the present copolymer resins, the percentage of unsaturated amide incorporated may be up to 35 percent, preferably from 2.5 percent to 35 percent of the total resin weight, although a percentage of 5 percent to 15 percent is preferred where the amide is included primarily as a site for cross-linking. Percentages of less than 2.5 percent of the unsaturated amide weight may be included by the present process, although these low percentages can also be incorporated with hydrophobic monomers by other techniques well known in emulsion polymerisation.

In general the proportion of amide employed further governs the proportion of Group II monomer to be used and the molar ratio of unsaturated amide to itaconate should not exceed 10:1. Where itaconic acid, monomethyl itaconate and monoethyl itaconate are employed the molar ratio of the amide to itaconate may be up to a maximum of 10:8, but this maximum is further limited by the necessity that itaconic acid may not be present in a proportion of greater than 15 percent of the resin weight nor the monoitaconate esters in proportions of greater than 20 percent. Dimethyl itaconate may be employed in proportions of up to 80 percent of the total resin weight and at the higher levels fulfills also the function of a Group IV monomer.

The water soluble solvent may be present in proportions of 1 percent to 10 percent of the monomer weight with a preferred ratio of 2 to 6 percent. These proportions are unchanged if the solvent is a water-soluble polymerisable monomer.

The monomers of Group IV may be divided into two sub-groups:
(a) Those which may be used singly.
(b) Those which must be used in conjunction with a monomer from Group IVa.

Monomers from Group IVa include:
(1) Monovinyl aromatic compounds of general structure

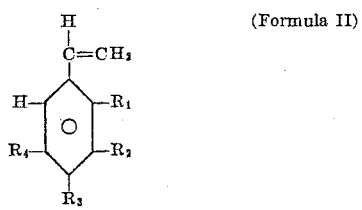

(Formula II)

where $R_1$, $R_2$, $R_3$ and $R_4$ may each be a hydrogen or halogen atom, or a lower alkyl methoxy, alkylamino, cyano or nitro radical. Alternatively adjacent positions may represent the junction of the benzene ring with a second aromatic nucleus as in $\alpha$-vinyl naphthalene and $\beta$-vinyl naphthalene. Styrenes substituted in both ortho positions do not fall within Group IVa.

Typical examples of Group IVa1 are styrene and the vinyl toluenes.

(2) Alkyl esters of unsaturated carboxylic acids of the general formula:

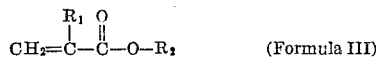

(Formula III)

where $R_1$ is a hydrogen atom or a methyl radical and $R_2$ is an alkyl radical of from 1 to 10 carbon atoms, when $R_1$ is a methyl radical, or $R_2$ is an alkyl radical of from 2 to 10 carbon atoms when $R_1$ is a hydrogen atom. Methyl acrylate is thus excluded from this category.

Typical examples of Group IVa2 are butyl acrylate methyl methacrylate, decyl acrylate and butyl methacrylate.

(3) Vinyl esters of the general formula:

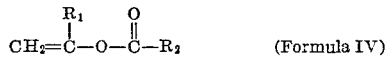

(Formula IV)

where $R_1$ is a hydrogen atom or a methyl radical and $R_2$ is an alkyl radical of up to four carbon atoms.

Typical examples of Group IVa3 are vinyl acetate, isopropenyl acetate, vinyl propionate and vinyl butyrate.

The following monomers fall within Group IVb: acrylic acid, methacrylic acid and high alkyl esters of these acids not included in Group IVa2, such as lauryl acrylate and cetyl methacrylate; methyl acrylate; hydroxyalkyl esters of acrylic and methacrylic acids, such as 2-hydroxyethyl acrylate 2 - hydroxypropyl acrylate, 2 - hydroxyethyl methacrylate and 2-hydroxypropyl methacrylate; alkylaminoalkyl esters of acrylic and methacrylic acids such as dimethylaminoethyl acrylate, diethylaminoethyl acrylate and t-butyl aminoethyl methacrylate; alkoxyalkyl esters of acrylic and methacrylic acids such as 2-ethoxyethyl acrylate and 2-ethoxyethyl methacrylate; glycidyl acrylate; glycidyl methacrylate; 2-cyanoethyl acrylate and 2-cyanoethyl methacrylate; higher vinyl esters, such as vinyl stearate and vinyl 2-ethyl hexoate; conjugated dienes, such as butadiene, isoprene and chloroprene; vinyl and vinylidene halides; vinyl ethers, such as vinyl butyl ether and vinyl 2-chloroethyl ether; mono and di-esters of malic and fumaric acids, including alkyl esters of up to ten carbon atoms; mono and di-esters of itaconic acid not included in Group II; substituted acrylamides not included in Group I; vinyl pyridine; $\alpha$-methyl styrene; N-vinyl pyrrolidone; and crotonic acid.

Also such diethylenically unsaturated compounds as divinyl benzene, ethylene glycol dimethacrylate and ethylene glycol dicrotonate may be included in proportions not exceeding 1% of the total monomer weight.

Various surface-active agents may be used as emulsion stabilisers in the production of the present emulsions. These include sodium lauryl sulphate ("Sulfapon" WA.2), triethanolamine lauryl sulphate ("Texapon" T), disodium dodecyl diphenyl ether disulphonate ("Dowfax" 2A1), tetrasodium-N-(1,2-dicarboxyethyl)-N-octadecyl sulphosuccinamide ("Aerosol" 22), the sodium salt of N-methyl taurine condensate with fatty acids ("Hostapon" TF), the sodium salt of an alkyl aryl polyether sulphonate ("Triton" X–200) and "Abex" 26S which is a proprietary material of undisclosed composition.

The emulsions may be prepared in a polymerisation vessel fitted with a source of heat, reflux condenser, agitator, a thermometer and a source of nitrogen. Various methods of preparation of these emulsions may be employed: in one preferred way all the components of emulsion except the initiator are charged into the reaction vessel initially. In other cases the monomers may be added to the reaction vessel continuously or incrementally throughout the reaction. The reaction temperatures used may vary from ambient to 100° C. with the preferred range 40–95° C. Redox initiator systems and the use of a nitrogen or inert atmosphere are preferred for temperatures below 70° C.

The following examples illustrate the invention.

*Example I*

The following materials were charged into a reaction vessel:

| | Grams |
|---|---|
| Styrene | 90 |
| 2-ethylhexyl acrylate | 70 |
| Acrylamide | 20 |
| Acrylonitrile | 10 |
| Itaconic acid | 10 |
| "Texapon" T.[1] | 1 |
| Ammonium persulphate | 1 |
| Water | 190 |

[1] Triethanolamine lauryl sulphate (80% active).

The mixture was stirred to produce an even emulsion, the reaction vessel was thoroughly purged with nitrogen and raised to 65° C. at which temperature 10 g. of a 10% solution of sodium metabisulphite were added to the charge. The reflux temperature rose to a maximum of 82° C. and after 45 minutes the polymerisation was virtually complete. The resulting emulsion was homodispersed and contained less than ½ g. of coagulum and was of a total solids of 50%. The average particle size of the latex was approximately 0.15 micron.

*Example II*

The following materials were charged into a reaction vessel:

| | Grams |
|---|---|
| Styrene | 160 |
| Acrylamide | 20 |
| Itaconic acid | 10 |
| Acrylonitrile | 10 |
| "Texapon" T | 1 |
| Ammonium persulphate | 1 |
| Water | 150 |

These components were raised to 65° C. as in Example I and at this temperature addition was commenced of 50 ml. of a solution of 2% sodium metabisulphite.

The addition was completed in 30 minutes and an external temperature of 65–70° C. was maintained for a further 30 minutes. Peak internal temperature reached was 77° C. Coagulum in this latex was 1½ g. The latex was of 50% solids, homodispersed and of a mean particle size of circa 0.1 micron.

*Example III*

The following materials were charged into a reaction vessel:

| | Grams |
|---|---|
| Butyl acrylate | 160 |
| Acrylamide | 20 |
| Itaconic acid | 10 |
| Acrylonitrile | 10 |
| "Texapon" T | 1 |
| Sodium metabisulphite | 1 |
| Water | 150 |

These components were heated to 60° C. under an atmosphere of nitrogen as before and addition then commenced of 50 g. of a 2% aqueous solution of ammonium persulphate, the addition being completed in a little over one hour. A latex of approximately 50% solids and particle size 0.2 micron was obtained after a further hour's heating at 75–80° C. Coagulum was 3 g.

*Example IV*

A latex was prepared similar to that of Example III save for the use of 2-ethylhexyl acrylate in place of butyl acrylate. This latex was rather finer than that obtained in Example III and contained no coagulum.

*Example V*

The following materials were charged into a reaction vessel:

| | Grams |
|---|---|
| Styrene | 100 |
| 2-ethylhexyl acrylate | 70 |
| Acrylamide | 20 |
| Dimethyl itaconate | 10 |
| Isopropanol | 10 |
| "Dowfax" 2A1 [1] | 2 |
| Water | 178 |

[1] Disodium dodecyl diphenyl ether disulphonate.

These were raised to 80° C., then at this temperature 12 g. of a 5% solution of ammonium persulphate were added over 150 minutes. The latex obtained was of 50% solids and contained no coagulum. Mean particle size was 0.15 micron.

*Example VI*

The following materials were charged into a reaction vessel:

| | Grams |
|---|---|
| Styrene | 100 |
| 2-ethylhexyl acrylate | 60 |
| Dimethyl itaconate | 20 |
| N-Methylol acrylamide | 24 |
| Dioxan | 10 |
| "Dowfax" 2A1 | 2 |
| Potassium bicarbonate | 0.3 |
| Water | 190 |

These were heated to 90° C. and an addition of 10 ml. of 5% ammonium persulphate was made over 80 minutes. Heating was maintained for a further 20 minutes. A homodisperse emulsion of approximately 0.12 micron was obtained which contained no coagulum.

*Example VII*

The following materials were charged into a reaction vessel:

| | Grams |
|---|---|
| Styrene | 100 |
| 2-ethylhexyl acrylate | 60 |
| Dimethyl itaconate | 20 |
| Methacrylamide | 20 |
| Dioxan | 5 |
| "Dowfax" 2A1 | 2 |
| Water | 193 |

These were heated with stirring to 90° C. and at this temperature 10 g. of a 4% solution of ammonium persulphate were added over three hours. Heating was maintained for a further two hours. A homodisperse emulsion of circa 0.15 micron was obtained. This contained about 2 g. of coagulum.

*Example VIII*

The following materials were charged into a reaction vessel:

| | Grams |
|---|---|
| Styrene | 40 |
| Butyl acrylate | 60 |
| Acrylamide | 70 |
| Itaconic acid | 30 |
| Isopropanol | 10 |
| "Dowfax" 2A1 | 3 |
| Water | 195 |
| Sodium metabisulphite | 1 |

These were raised to 70° C. with stirring and 50 ml. of 2% ammonium persulphate solution then added over one hour. The temperature was raised to 85° C. and heating was continued for a further hour and a 43% solids emulsion of circa 0.12–0.15 micron average particle size and medium viscosity was obtained. The emulsion contained no coagulum.

*Example IX*

In a reaction vessel were placed 5 g. of 80% purity triethanolamine lauryl sulphate and 155 g. water and the temperature was raised to 90° C. At this temperature, was commenced the addition of 195 g. of 2-ethylhexyl acrylate and of two solutions, one containing 4 g. of acrylamide and 1 g. of itaconic acid in 40 ml. water, and the other containing 5 g. ammonium persulphate in 10 ml. water. The time of addition for the monomers and catalysts was two hours and heating was continued for a further half hour. The resulting latex was of even particle size with a mean value of circa 0.17 micron. Coagulum was 3 g.

A similar latex was prepared with butyl acrylate.

*Example X*

The following materials were charged into a reaction vessel:

| | Grams |
|---|---|
| Methyl methacrylate | 100 |
| Butyl acrylate | 70 |
| Acrylamide | 20 |
| Itaconic acid | 10 |
| Isopropanol | 10 |
| "Abex" 26S | 5 |

| | Grams |
|---|---|
| Sodium metabisulphite | 1 |
| Water | 140 |

This mixture was heated while stirred to 75° C. and at this temperautre the addition was commenced of 50 ml. of a 2% solution of ammonium persulphate. The addition was completed in 30 minutes and heating was continued for a further two hours. A coagulum-free latex of circa 50% total solids and a particle size of circa 0.13 micron was obtained.

*Example XI*

The following materials were charged into a reaction vessel:

| | Grams |
|---|---|
| Butyl acrylate | 100 |
| Dimethyl itaconate | 80 |
| Acrylamide | 20 |
| "Abex" 26S | 5 |
| Dioxan | 5 |
| Water | 190 |

This mixture was raised to 95° C. while being stirred and at this temperature 10 ml. of a 4% solution of ammonium persulphate were added over four hours. Heating was maintained for a further hour. A latex of circa 48% solids and particle size of 0.2 micron was obtained. The latex contained no coagulum.

*Example XII*

The following materials were charged into a reaction vessel:

| | Grams |
|---|---|
| Vinyl acetate | 170 |
| Acrylamide | 20 |
| Itaconic acid | 10 |
| Isopropanol | 10 |
| "Abex" 26S | 5 |
| Sodium metabisulphite | 1 |
| Water | 140 |

The reaction vessel was thoroughly purged with nitrogen and the stirred mixture raised to 55° C. at which temperature the addition was commenced of 50 ml. of a 2% aqueous solution of ammonium persulphate. The time of addition was 3½ hours and at the end of this time the temperature of the mixture had been raised to 85° C. Heating was then continued for 30 minutes and, after cooling, a stable emulsion of medium particle size containing circa 50% solids and containing circa 2 g. coagulum was obtained.

*Example XIII*

A latex was prepared similar to that of Example V save for the use of a redox catalyst system, a triethanolamine lauryl sulphate surfactant and the replacement of 2-ethylhexyl acrylate by lauryl methacrylate. This latex was of 50% total solids, a particle size of circa 0.13 micron and contained 1 g. of coagulum.

*Example XIV*

The following materials were charged into a reaction vessel:

| | Grams |
|---|---|
| Styrene | 100 |
| 2-ethylhexyl acrylate | 70 |
| Acrylamide | 20 |
| Itaconic acid | 10 |
| Ethanol | 10 |
| "Texapon" T | 1 |
| Sodium metabisulphite | 1 |
| Water | 138 |

These were heated, with stirring, to 60° C. and at this temperature was commenced the addition of 50 ml. of a 2% solution of ammonium persulphate. The addition was completed in one hour during which the bath temperature was allowed to rise to 78° C. There was obtained a 51% solids emulsion which was free from coagulum. The emulsion was homodisperse and had a particle size of circa 0.14 micron.

*Example XV*

The following materials were charged into a reaction vessel:

| | Grams |
|---|---|
| Styrene | 100 |
| 2-ethylhexyl acrylate | 70 |
| Acrylamide | 20 |
| Monomethyl itaconate | 10 |
| Isopropanol | 10 |
| "Dowfax" 2A1 | 2 |
| Sodium metabisulphite | 1 |
| Water | 140 |

These were heated to 65° C., and at this temperature 50 ml. of a 2% solution of ammonium persulphate were added over 2 hours. The emulsion obtained was superficially identical to that obtained from Example V.

*Example XVI*

5 g. of "Dowfax" 2A1 were dissolved in 150 g. of water and heated to 80° C. At this temperature the addition was commenced of 185 g. of vinyl toluene and a solution of 10 g. of acrylamide and 5 g. itaconic acid in 40 g. water and 10 g. dioxan. 10% of the monomers were initially charged to a reaction vessel and the addition of the remainder, starting 15 minutes after initiation, was completed in 1 hour 45 mins., 8 ml. of a 4% solution of ammonium persulphate were added during the reaction. The emulsion obtained had a particle size of circa 0.12 micron and contained very little coagulum.

*Example XVII*

To a reaction vessel were charged 2 g. "Dowfax" 2A1, 5 g. dioxan and 150 g. of water, followed by 20% each of a mix of 90 g. styrene and 95 g. butyl acrylate and a solution of 10 g. acrylamide, 5 g. itaconic acid and 5 g. "Dowfax" 2A1 in 40 g. water. The mixture was catalysed at 90° C. with 2 ml. of a 4% solution of ammonium persulphate. On polymerisation of this initial charge, addition of the remaining monomer was commenced, being completed in two hours. A further 8 ml. of the catalyst solution were added during the reaction. A very homodisperse emulsion of a particle size circa 0.2 micron was obtained. This was of very low viscosity and contained no coagulum.

*Example XVIII*

To a reaction vessel were charged 5 g. "Triton" X-200, 5 g. dioxan and 150 g. water, followed by 10% each of a mix of 85 g. methyl methacrylate and 100 g. isobutyl acrylate and a solution of 10 g. acrylamide, 5 g. itaconic acid and 5 g. "Dowfax" 2A1 in 40 g. water. The polymerisation was carried out as is Example XVII, and a coagulum-free emulsion of particle size 0.11 micron was obtained.

*Example XIX*

This was a modification of Example XVIII in which the amounts of acrylamide and itaconic acid were raised to 20 g. and 10 g. respectively and the amounts of methyl methacrylate and isobutyl acrylate reduced to 80 g. and 90 g. respectively. An emulsion of circa 0.15 micron particle size was obtained.

*Example XX*

The following materials were charged into a reaction vessel:

| | Grams |
|---|---|
| Methyl methacrylate | 80 |
| Butyl acrylate | 80 |
| Dimethyl itaconate | 20 |
| Acrylamide | 20 |
| Isopropanol | 10 |

|   | Grams |
|---|---|
| "Aerosol" 22 | 3 |
| "Triton" X–200 | 3 |
| Sodium metabisulphite | 1 |
| Water | 170 |

These were heated to 68° C. and 4 ml. of a 10% solution of ammonium persulphate were added. After 30 mins. the temperature was raised to 90° C. at which it was maintained for a further hour before cooling. Another 6 ml. of the persulphate solution were added during this period. A coagulum-free emulsion of circa 0.16 micron particle size was obtained.

*Example XXI*

This example was very similar to Example VII save that all the 2-ethylhexyl acrylate was replaced by styrene, the amount of "Dowfax" 2A1 was raised to 3 g. and 3 g. "Triton" X–200 was added. The reaction was much more rapid and a coagulum-free emulsion of circa 0.12 micron particle size was obtained.

*Example XXII*

The following materials were charged into a reaction vessel:

|   | Grams |
|---|---|
| Methyl methacrylate | 80 |
| Butyl acrylate | 80 |
| Dimethyl itaconate | 20 |
| Methacrylamide | 20 |
| "Dowfax" 2A1 | 5 |
| Dioxan | 10 |
| Water | 180 |

These were heated to 90° C. and at this temperature 10 ml. of a 4% solution of ammonium persulphate were added over one hour. Heating was continued for a further 30 mins. and an emulsion of particle size 0.20 to 0.25 micron containing ¼ g. of coagulum was obtained.

*Example XXIII*

5 g. "Triton" X–200, 5 g. dioxan and 140 g. water were added to a reaction vessel and heated to 85° C. at which temperature was added 2 ml. of 4% ammonium pursulphate and 25% of each of the two following mixes:

(1)

|   | Grams |
|---|---|
| Methyl methacrylate | 85 |
| Isobutyl acrylate | 100 |

(2)

|   |   |
|---|---|
| 60% N-methylol acrylamide solution | 20 |
| Itaconic acid | 5 |
| 0.880 ammonia solution | 6.5 |
| "Dowfax" 2A1 | 5 |
| Water | 35 |

After 20 minutes, addition of the remaining monomers was commenced and completed in 90 minutes, a further 8 ml. of persulphate solution being added during this period. Heating was continued at 90–95° C. for a further 30 minutes, and at the end of this period 0.2 ml. tertiary butyl hydroperoxide plus 0.2 g. sodium metabisulphite in 2 ml. water were added. On cooling a homodisperse emulsion of 0.2 micron particle size which contained circa 1 g. coagulum was obtained.

*Example XXIV*

This was similar to Example XXIII save that the methyl methacrylate and isobutyl acrylate were replaced by styrene—100 g. and 2-ethylhexyl acrylate—85 g., and that the 5 g. of "Triton" X–200 were replaced by 2 g. of "Dowfax" 2A1. The emulsion obtained was very similar to that obtained from Example XXIII.

*Example XXV*

This example was identical to Example XXIII save that 10 g. of the 60% N-methylol acrylamide were replaced by 5 g. acrylamide and 5 g. water. The emulsion obtained was rather finer than that obtained in Example XXIII.

*Example XXVI*

The following components were charged into a reaction vessel:

|   |   |   |
|---|---|---|
| Styrene | lbs | 15 |
| 2-ethyl hexyl acrylate | lbs | 10½ |
| Acrylamide | lbs | 3 |
| Itaconic acid | lbs | 1½ |
| Isopropanol | lbs | 1½ |
| "Texapon" T | grams | 70 |
| Sodium metabisulphite | do | 70 |
| Water | lbs | 30 |

These were raised to 65° C. and at this temperature a solution of 70 g. of ammonium persulphate in 300 g. of water was added over two hours. The reaction temperature was then raised to 85° C., at which it was maintained for one hour. On cooling a coagulum-free latex of 48% solids and particle size of 0.16 micron was obtained.

Having thus described the invention, what is claimed as new and desired to be secured by Letters Patent is:

1. A process for preparing an aqueous copolymer emulsion, which comprises subjecting to aqueous emulsion polymerisation at temperatures varying from ambient to 100° C. in the presence of a radical-producing initiator and an emulsion stabiliser a mixture comprising
   (I) an ethylenically unsaturated amide of the general formula

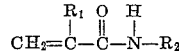

where $R_1$ is selected from the group consisting of hydrogen and methyl and $R_2$ is selected from the group consisting of hydrogen and hydroxymethyl,
   (II) at least one itaconate monomer selected from the group consisting of itaconic acid, monomethyl itaconate, dimethyl itaconate and monoethyl itaconate,
   (III) an at least partially water-soluble organic solvent, which is selected from the group consisting of monohydric alcohols containing up to 4 carbon atoms; water-soluble unsubstituted 5-membered heterocyclic organic compounds; water-soluble heterocyclic organic compounds having a 5-membered ring which is substituted with a substituent selected from the group consisting of oxygen, hydroxyl and alkyl containing up to 4 carbon atoms; acetone, methyl ethyl ketone, methyl vinyl ketone; acetonitrile, propionitrile; N,N-dimethyl formamide, N,N-diethyl formamide; dioxan; dimethyl sulphoxide; acrylonitrile and methacrylonitrile, and
   (IV) at least one other ethylenically unsaturated monomer copolymerisable with said monomers (I) and (II), said unsaturated amide monomer (I) being present in an amount of up to 35 percent by weight of the polymerisable constituents of the mixture and said organic solvent being present in an amount between 1 and 10 percent by weight of the polymerisable constituents of the mixture.

2. The process of claim 1, wherein the molar ratio of unsaturated amide monomer (I) to itaconate monomer (II) does not exceed 10 to 1.

3. The process of claim 1, wherein said organic solvent is present in an amount of 2 to 6 percent by weight of the polymerisable constituents of the mixture.

4. The process of claim 1, wherein said unsaturated amide monomer (I) is present in an amount of from 5 to 15 percent by weight of the polymerisable constituents of the mixture.

5. A process for preparing an aqueous copolymer emulsion which comprises subjecting to aqueous emulsion polymerisation at temperatures varying from ambient to 100° C. in the presence of a radical-producing initiator and an emulsion stabiliser a mixture comprising (I) an ethylenically unsaturated amide of the general formula

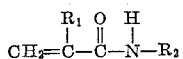

where $R_1$ is selected from the group consisting of hydrogen and methyl, and $R_2$ is selected from the group consisting of hydrogen and hydroxymethyl, said amide being present in an amount of from 2.5 percent to 35 percent by weight of the polymerisable constituents of the mixture, (II) an itaconate monomer selected from the group consisting of monomethyl itaconate and monoethyl itaconate in a proportion not exceeding 20 percent by weight of the polymerisable constituents of the mixture, the molar ratio of unsaturated amide monomer (I) to itaconate monomer (II) being a maximum of 10 to 8, (III) an at least partially water-soluble organic solvent, which is present in an amount of from 1 to 10 percent by weight of the polymerisable constituents of the mixture, and which is selected from the group consisting of monohydric alcohols containing up to 4 carbon atoms; water-soluble unsubstituted 5-membered heterocyclic organic compounds; water-soluble heterocyclic organic compounds having a 5-membered ring which is substituted with a substituent selected from the group consisting of oxygen, hydroxyl and alkyl containing up to 4 carbon atoms; acetone, methyl ethyl ketone, methyl vinyl ketone; acetonitrile, propionitrile; N,N-dimethyl formamide, N,N-diethyl formamide; dioxan; dimethyl sulphoxide; acrylonitrile and methacrylonitrile, and (IV) at least one other ethylenically unsaturated monomer copolymerisable with said monomers (I) and (II).

6. A process for preparing an aqueous copolymer emulsion, which comprises subjecting to aqueous emulsion polymerisation at temperatures varying from ambient to 100° C. in the presence of a radical-producing initiator and an emulsion stabiliser a mixture comprising (I) an ethylenically unsaturated amide of the general formula

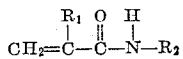

where $R_1$ is selected from the group consisting of hydrogen and methyl, and $R_2$ is selected from the group consisting of hydrogen and hydroxymethyl, said amide being present in an amount of from 2.5 percent to 35 percent by weight of the polymerisable constituents of the mixture, (II) itaconic acid present in a proportion up to 15 percent by weight of the polymerisable constituents of the mixture, the molar ratio of unsaturated amide monomer (I) to itaconic acid being a maximum of 10 to 8, (III) an at least partially water-soluble organic solvent, which is present in an amount of from 1 to 10 percent by weight of the polymerisable constituents of the mixture, and which is selected from the group consisting of monohydric alcohols containing up to 4 carbon atoms; water-soluble unsubstituted 5-membered heterocyclic organic compounds; water-soluble heterocyclic organic compounds having a 5-membered ring which is substituted with a substituent selected from the group consisting of oxygen, hydroxyl and alkyl containing up to 4 carbon atoms; acetone, methyl ethyl ketone, methyl vinyl ketone; acetonitrile, propionitrile; N,N-dimethyl formamide, N,N-diethyl formamide; dioxan; dimethyl sulphoxide; acrylonitrile and methacrylonitrile, and (IV) at least one other ethylenically unsaturated monomer copolymerisable with said monomers (I) and (II).

7. A process for preparing an aqueous copolymer emulsion which comprises subjecting to aqueous emulsion polymerisation at temperatures varying from ambient to 100° C. in the presence of a radical-producing initiator and an emulsion stabiliser a mixture comprising (I) an ethylenically unsaturated amide of the general formula

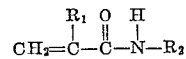

where $R_1$ is selected from the group consisting of hydrogen and methyl and $R_2$ is selected from the group consisting of hydrogen and hydroxymethyl, said amide being present in an amount of from 2.5 percent to 35 percent by weight of the polymerisable constituents of the mixture, (II) dimethyl itaconate, (III) an at least partially water-soluble organic solvent, which is present in an amount of from 1 to 10 percent by weight of the polymerisable constituents of the mixture, and which is selected from the group consisting of monohydric alcohols containing up to 4 carbon atoms; water-soluble unsubstituted 5-membered heterocyclic organic compounds; water-soluble heterocyclic organic compounds having a 5-membered ring which is substituted with a substituent selected from the group consisting of oxygen, hydroxyl and alkyl containing up to 4 carbon atoms; acetone, methyl ethyl ketone, methyl vinyl ketone; acetonitrile, propionitrile; N,N-dimethyl formamide, N,N-diethyl formamide; dioxan; dimethyl sulphoxide; acrylonitrile and methacrylonitrile, and (IV) at least one ethylenically unsaturated monomer, selected from the group consisting of dimethyl itaconate and other ethylenically unsaturated monomers copolymerisable with said ethylenically unsaturated amide and dimethyl itaconate, the dimethyl itaconate being present in an amount up to 80 percent by weight of the polymerisable constituents of the mixture.

8. A process for preparing an aqueous, copolymer emulsion, which comprises subjecting to aqueous emulsion polymerisation at temperatures varying from ambient to 100° C. a mixture comprising (I) an ethylenically unsaturated amide of the general formula

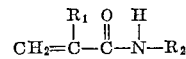

where $R_1$ is selected from the group consisting of hydrogen and methyl and $R_2$ is selected from the group consisting of hydrogen and hydroxymethyl, said amide being present in an amount of up to 35 percent by weight of the polymerisable constituents of the mixture, (II) at least one itaconate monomer selected from the group consisting of itaconic acid, monomethyl itaconate, dimethyl itaconate and monoethyl itaconate, (III) an organic solvent which is soluble in water in a concentration above 10 percent by weight and which is a water-soluble monomer polymerisable with the other constituents of the mixture, and (IV) at least one other ethylenically unsaturated monomer copolymerisable with the other constituents of the mixture.

9. The process of claim 8, wherein said organic solvent is a water-soluble polymerisable monomer selected from the group consisting of acrylonitrile, methacrylonitrile and methylvinylketone.

10. A process for preparing an aqueous copolymer emulsion, which comprises subjecting to aqueous emulsion polymerisation at temperatures varying from ambient to 100° C. a mixture comprising (I) an ethylenically unsaturated amide of the general formula

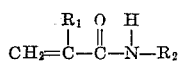

where $R_1$ is selected from the group consisting of hydrogen and methyl and $R_2$ is selected from the group consisting of hydrogen and hydroxymethyl, said amide being present in an amount of from 2.5 percent to 35 percent by weight of the polymerisable constituents of the mixture,
(II) an itaconate monomer selected from the group consisting of itaconic acid, monomethyl itaconate, dimethyl itaconate and monoethyl itaconate,
(III) an at least partially water-soluble organic solvent, which is present in an amount of from 1 to 10 percent by weight of the polymerisable constituents of the mixture, and which is selected from the group consisting of monohydride alcohols containing up to 4 carbon atoms; water-soluble unsubstituted 5-membered heterocyclic organic compounds; water-soluble heterocyclic organic compounds having a 5-membered ring which is substituted with a substituent selected from the group consisting of oxygen, hydroxyl and alkyl containing up to 4 carbon atoms; acetone, methyl ethyl ketone, methyl vinyl ketone, acetonitrile, propionitrile; N,N-dimethyl formamide, N,N-diethyl formamide; dioxan; dimethyl sulphoxide; acrylonitrile and methacrylonitrile.
(IV) at least one ethylenically unsaturated monomer copolymerisable with said monomers (I) and (II),
(V) water,
(VI) an emulsion stabiliser, and
(VII) a radical-producing initiator.

11. The process of claim 10, wherein said emulsion stabilizer is selected from the group consisting of triethanolamine lauryl sulphate, disodium dodecyl diphenyl ether disulphonate, the sodium salt of an alkyl aryl polyether sulphonate and tetrasodium-N-(1,2-dicarboxyethyl)-N-octadecyl sulphosuccinamide.

12. The process of claim 10, wherein the radical-producing initiator is selected from the group consisting of peroxydisulphate salts, organic peroxides, organic hydroperoxides and azo compounds.

13. The process of claim 12, wherein said initiator is used in conjunction with an activator selected from sodium bisulphite, sodium formaldehyde sulphoxylate and heavy metal ions.

14. The process of claim 10, wherein the molar ratio of unsaturated amide monomer (I) to itaconate monomer (II) does not exceed 10 to 1.

15. The process of claim 10, wherein said unsaturated amide monomer (I) is present in an amount of from 5 to 15 percent by weight of the polymerisable constituents of the mixture.

16. The process of claim 10, wherein said organic solvent is a water-soluble polymerisable monomer selected from acrylonitrile, methacrylonitrile and methylvinylketone.

17. A process for preparing an aqueous copolymer emulsion, which comprises subjecting to aqueous polymerisation in the presence of an emulsion stabiliser and a redox initiator system under an inert atmosphere and at a temperature varying from ambient to below 70° C. a mixture comprising
(I) an ethylenically unsaturated amide of the general formula

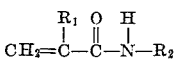

where $R_1$ is selected from the group consisting of hydrogen and methyl and $R_2$ is selected from the group consisting of hydrogen and hydroxymethyl, said amide being present in an amount of up to 35 percent by weight of the polymerisable constituents of the mixture,
(II) at least one itaconate monomer selected from the group consisting of itaconic acid, monomethyl itaconate, dimethyl itaconate and monomethyl itaconate,
(III) an at least partially water-soluble organic solvent, which is present in an amount of from 1 to 10 percent by weight of the polymerisable constituents of the mixture, and which is selected from the group consisting of monohydric alcohols containing up to 4 carbon atoms; water soluble unsubstituted 5-membered heterocyclic organic compounds; water-soluble heterocyclic organic compounds having a 5-membered ring which is substituted with a substituent selected from the group consisting of oxygen, hydroxyl and alkyl containing up to 4 carbon atoms; acetone, methyl ethyl ketone, methyl vinyl ketone; acetonitrile, propionitrile; N,N-dimethyl formamide, N,N-diethyl formamide; dioxan; dimethyl sulphoxide; acrylonitrile and methacrylonitrile, and
(IV) at least one other ethylenically unsaturated monomer copolymerisable with said monomers (I) and (II).

18. A process for preparing an aqueous copolymer emulsion, which comprises subjecting to aqueous emulsion polymerisation at temperatures varying from ambient to 100° C. a mixture comprising
(I) an ethylenically unsaturated amide of the general formula

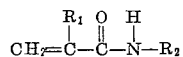

where $R_1$ is selected from the group consisting of hydrogen and methyl and $R_2$ is selected from the group consisting of hydrogen and hydroxymethyl, said amide being present in an amount of from 2.5 to 35 percent by weight of the polymerisable constituents of the mixture,
(II) an itaconate monomer selected from the group consisting of itaconic acid, monomethyl itaconate, dimethyl itaconate and monomethyl itaconate, the amount of said itaconic acid not exceeding 15 percent by weight of the polymerisable constituents of the mixture and the amount of said monoesters of itaconic acid not exceeding 20 percent by weight of the polymerisable constituents of the mixture,
(III) an at least partially water-soluble organic solvent, which is present in an amount of from 1 to 10 percent by weight of the polymerisable constituents of the mixture, and which is selected from the group consisting of monohydric alcohols containing up to 4 carbon atoms; water-soluble unsubstituted 5-membered heterocyclic organic compounds; water-soluble heterocyclic organic compounds having a 5-membered ring which is substituted with a substituent selected from the group consisting of oxygen, hydroxyl and alkyl containing up to 4 carbon atoms; acetone, methyl ethyl ketone, methyl vinyl ketone; acetonitrile, propionitrile; N,N-dimethyl formamide, N,N-diethyl formamide; dioxan; dimethyl sulphoxide; acrylonitrile and methacrylonitrile,
(IV) at least one other ethylenically unsaturated monomer copolymerisable with said monomers (I) and (II) and selected from the group consisting of monovinyl aromatic compounds, alkyl esters of unsaturated carboxylic acids containing from 4 to 14 carbon atoms in the molecule, vinyl esters, mixtures of said ethylenically unsaturated monomers, and mixtures of at least one of said monomers and at least one other ethylenically unsaturated monomer not copolymerisable with said monomers (I) and (II) except in the presence of said first-named ethylenically unsaturated monomers,
(V) water,
(VI) at least one emulsion stabiliser, and (VII) at least one radical-producing polymerisation initiator.

19. The process of claim 18 wherein said mixture comprises (I) acrylamide, (II) itaconic acid (III) acrylonitrile (IV) an ethylenically unsaturated monomer selected from the group consisting of styrene, 2-ethylhexyl acrylate, and butylacrylate.

20. The aqueous copolymer emulsion prepared by the process of claim 1.

21. The aqueous copolymer emulsion prepared by the process of claim 7.

22. The aqueous copolymer emulsion prepared by the process of claim 8.

23. The aqueous copolymer emulsion prepared by the process of claim 10.

24. The aqueous copolymer emulsion prepared by the process of claim 17.

25. The aqueous copolymer emulsion prepared by the process of claim 18.

26. The aqueous copolymer emulsion prepared by the process of claim 19.

27. A film formed by drying the emulsion claimed in claim 1.

28. A surface coating composition comprising the emulsion of claim 1, pigments and fillers.

References Cited by the Examiner
UNITED STATES PATENTS

| | | | |
|---|---|---|---|
| 2,795,564 | 6/1957 | Conn et al. | 260—80.5 |
| 2,861,060 | 11/1958 | Goode | 260—78.5 |
| 2,873,212 | 2/1959 | Roesder | 260—80.5 |
| 2,997,465 | 8/1961 | Krause et al. | 260—80.5 |

SAMUEL H. BLECH, *Primary Examiner.*

MURRAY TILLMAN, *Examiner.*

J. ZIEGLER, *Assistant Examiner.*